UNITED STATES PATENT OFFICE.

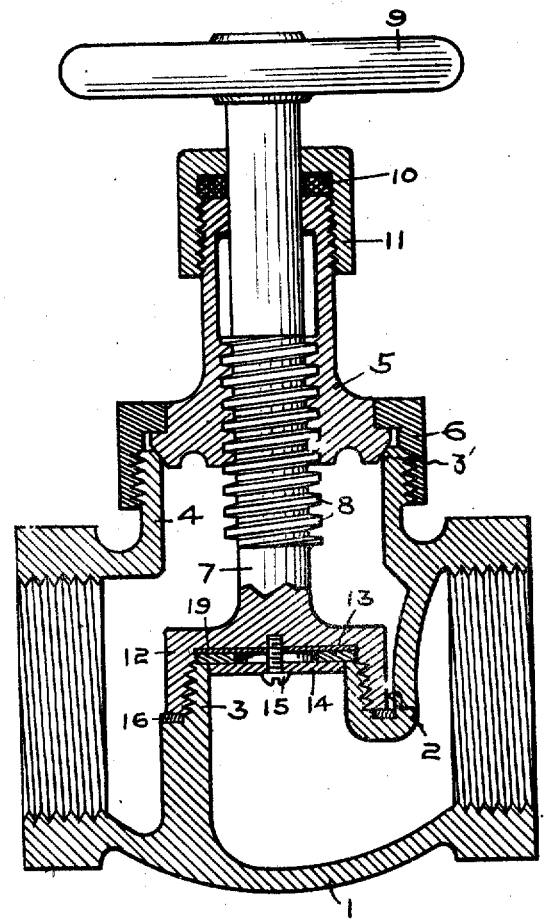

WILLIAM B. VESTAL, OF PLAINFIELD, INDIANA.

PIPE-VALVE.

No. 911,095.  Specification of Letters Patent.  Patented Feb. 2, 1909.

Application filed April 27, 1906. Serial No. 314,067.

*To all whom it may concern:*

Be it known that I, WILLIAM B. VESTAL, a citizen of the United States, residing at Plainfield, in the county of Hendricks and State of Indiana, have invented certain new and useful Improvements in Pipe-Valves, of which the following is a specification.

This invention relates to improvements in valves for all general purposes and particularly for high pressure pipes, and the object of the invention is to provide a simple and durable device which will insure a complete cutoff.

I accomplish the objects of the invention by the mechanism illustrated in the accompanying drawing which represents a vertical section of a valve containing my improvements taken on a plane extending longitudinally of the pipes connected with said valve.

Referring to the drawing, 1 represents the body of my improved valve having the partition 2. Formed through this partition is an opening surrounded by the tubular wall 3. The walls 3 are tapering on their outer faces to form a truncated conical extension which is screw-threaded in the manner shown in the drawing. The body 1 has a valve-stem opening which is surrounded by the externally screw-threaded cylindrical walls 4 with an inside bevel 2, and 5 is a cap with a slightly beveled inner end 3', which is seated in the beveled opening at the upper end of the walls 4.

6 is an internally screw-threaded coupling ring which screws upon the threads of the walls 4 and draws the cap 5 firmly into its seat in the end of the valve-stem opening.

7 is the valve-stem having the screw-threads 8 which engage corresponding screw-threads on the interior bore of the cap 5. The stem 7 has the usual hand wheel 9 for rotating the stem and the escape of steam or gases around the stem at the outer bore of the cap is prevented by the usual packing 10 which is drawn tight by the usual stuffing-ring 11. The inner end of the stem 7 is enlarged and is provided with an internally screw-threaded tapering socket which is screwed upon the threaded walls surrounding the valve wall 3.

13 is a packing ring of copper or other material softer than the metal of the valve-seat, which ring is held in place by the plate 14. The plate 14 is retained in position against the ring 13 by the screw 15. The lower end of the socket 12 has its bearing against the packing-ring 16 located upon a suitable shoulder at the base of the truncated conical walls surrounding the valve opening. The ring 6 enables the cap 5 to be turned into such a position as will permit the threads in the socket 12 to take hold properly of the threads on the walls surrounding the valve-seat, and the required adjustment will be retained by tightening the ring 6 upon the walls 4 in the manner as will be readily understood from the drawing. The rotation of the valve stem 7 causes a wearing friction on the softer packing 13 which I relieve by a thin washer 19 between these parts. The material of this washer will be brass or harder metal than the packing 13.

Having thus fully described my invention, what I claim as new and wish to secure by Letters Patent of the United States, is—

1. A valve having a valve-seat with an externally screw-threaded wall, a valve-stem having a screw-threaded body and a screw-threaded socket to screw upon and envelop the threaded wall of the valve-seat said valve-seat forming a bearing against the inner end of the socket, and the wall of said socket forming a bearing against the base of the valve-seat, and a removable packing between each of said bearings, an opening through the wall of the valve for the admission of the socket said opening having an externally screw-threaded wall with beveled inner edge, a cap with beveled inner end, an internally threaded coupling-ring screwing upon the last wall to attach the cap, said cap having internal screw-threads to engage those of the stem, and a stuffing ring and packing to pack the joints between the stem and cap.

2. A valve having a valve-seat with an externally screw-threaded wall, a valve-stem having a screw-threaded body and a screw-threaded socket to envelop the threaded wall of the valve-seat, a removable packing of softer material than the stem and seat at the inner end of the socket, and a washer of a harder material than the packing interposed between the socket and packing, an opening through the wall of the valve for the admission of the socket said opening having an externally screw-threaded wall with beveled inner edge, a cap with beveled inner end, an internally threaded coupling-ring screwing upon the last wall to attach the cap, said cap having internal screw-threads to engage those of the stem, and a stuffing ring and
5 packing to pack the joints between the stem and cap.

In witness whereof, I, have hereunto set my hand and seal at Indianapolis, Indiana, this, ninth day of April, A. D. one thousand nine hundred and six.

WILLIAM B. VESTAL. [L. S.]

Witnesses:
J. A. MINTURN,
F. W. WOERNER.